Aug. 9, 1932.  J. GAFNEY  1,870,286

MAGNETIC BRAKE SHOES FOR AEROPLANES

Filed Aug. 13, 1929

Inventor
James Gafney

Patented Aug. 9, 1932

1,870,286

UNITED STATES PATENT OFFICE

JAMES GAFNEY, OF NEW YORK, N. Y.

MAGNETIC BRAKE SHOES FOR AEROPLANES

Application filed August 13, 1929. Serial No. 385,531.

This invention relates to improvements in aeroplanes and has for its object to provide a magnetic brake for an aeroplane.

Another object of the invention is to provide in an aeroplane brake shoes formed of a magnetized metal and means whereby the shoes may be dropped below the fuselage or raised above the lower line of the fuselage.

A further object of the invention is to provide the combination of an aeroplane and a landing field said aeroplane having magnetic brake shoes and said landing field having a metal surface having magnetic affinity for said shoes whereby the coaction of said landing field and brake shoes will quickly and without jarr bring the plane to a prompt stop.

With the above and such other objects in view as may hereinafter more fully appear, I have invented the device shown in the accompanying drawing in which.

Figure 1:
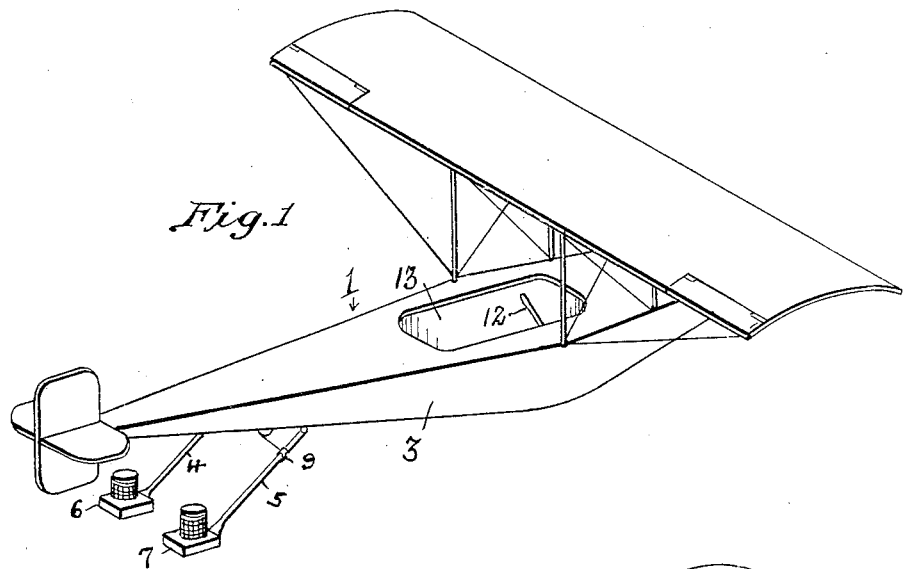
Figure 1 is a diagrammatic view, embracing my invention.
Figure 2:
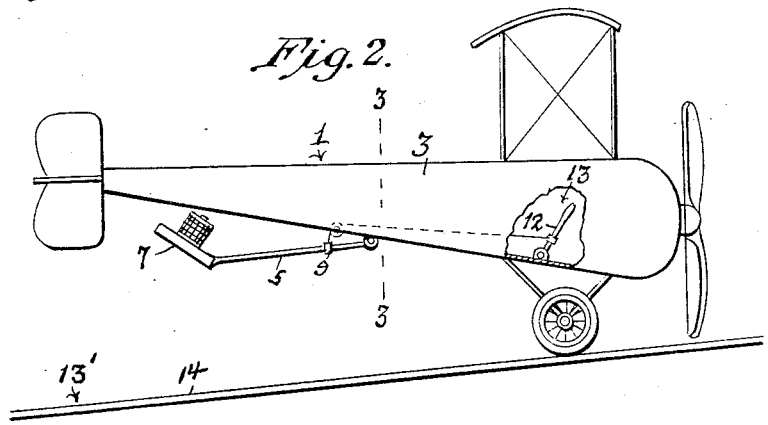
Figure 2 is a side elevational view of a plane showing the brake shoes in a changed position.
Figure 3:
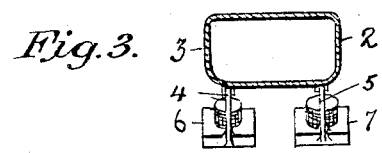
Figure 3 is a section on line 3—3 thereof.

Like reference characters indicate like parts throughout the following specification, and in the several views in the drawing in which 1 indicates an aeroplane, having pivoted to its sides 2 and 3 brake supporting arms 4 and 5 to the outer ends of which are secured magnets 6 and 7. To the arms 4 and 5 are fixed levers 8 and 9 connected by cables 10 and 11 to a hand controlled lever 12 in the cock pit 13 of the plane in order that the aviator may raise or lower the brakes 6 and 7 at will. When it is desired to land upon the landing platform 13, which is provided with a steel surface 14, the aviator releases the brakes 6 and 7, in order that they may drop to the position shown in Figure 2, and then brings his machine to the platform 13, permitting the magnets 6 and 7 to drag upon the surface 14, the magnetic attraction between the said surface 14 and the brakes 6 and 7 tending to promptly and quickly pull the plane to a standstill and without undue jarr and no bumping and jumping as where a landing is made in the usual manner.

Having described my invention that which I claim to be new and desire to procure by Letters Patent is:

In a landing device for aeroplanes, a pair of tail end skids, a magnet on each skid, arms fixed to the skids and hingedly connected to the fuselage, of the aeroplane at opposite sides thereof, a hand lever and a cable attached thereto and to said arms whereby the skids my be raised or lowered, in combination with a steel surfaced landing platform.

In testimony whereof I affix my signature.

JAMES GAFNEY.